United States Patent
Bhakta et al.

(10) Patent No.: US 8,823,822 B1
(45) Date of Patent: Sep. 2, 2014

(54) DETERMINING PHASE TRANSFER FUNCTION

(75) Inventors: Vikrant R. Bhakta, Dallas, TX (US); Marc P. Christensen, McKinney, TX (US)

(73) Assignee: Southern Methodist University, Dallas, TX (US)

( * ) Notice: Subject to any disclaimer, the term of this patent is extended or adjusted under 35 U.S.C. 154(b) by 724 days.

(21) Appl. No.: 13/026,141

(22) Filed: Feb. 11, 2011

(51) Int. Cl.
*H04N 5/228* (2006.01)
*G06K 9/40* (2006.01)

(52) U.S. Cl.
USPC ...................................... 348/222.1; 382/255

(58) Field of Classification Search
USPC ........................... 382/266, 280, 255; 356/124
See application file for complete search history.

(56) References Cited

U.S. PATENT DOCUMENTS

| | | | |
|---|---|---|---|
| 5,616,912 A | 4/1997 | Robinson et al. | |
| 5,912,768 A | 6/1999 | Sissom et al. | |
| 6,229,913 B1 | 5/2001 | Nayar et al. | |
| 7,019,826 B2 | 3/2006 | Vook et al. | |
| 7,518,712 B2 | 4/2009 | Sadoulet et al. | |
| 7,783,440 B1 * | 8/2010 | Lewis et al. | 702/77 |
| 7,844,079 B2 | 11/2010 | Hassebrook et al. | |
| 2002/0006282 A1 | 1/2002 | Ushiro et al. | |
| 2009/0046164 A1 | 2/2009 | Shroff et al. | |
| 2011/0169915 A1 | 7/2011 | Bloom et al. | |

OTHER PUBLICATIONS

Oguchi, Nov. 20, 2010.*
Vikrant, Mar. 4, 2002.*
Dina, Apr. 10, 2003.*
Anonymous ECCV submission, "Perspective Imaging under Structured Light," Paper ID 951, Mar. 17, 2010, 14 pages.
Anonymous ECCV submission, Perspective Imaging under Structured Light 'Supplementary Material,' Mar. 17, 2010, 8 pages.
Barrett, Eamon, "New approaches to image super-resolution beyond the diffraction limit," Unconventional Imaging III, Proc. of SPIE, vol. 6712, 67120D, 2007, 14 pages.
Bhakta, V. R. et al., "Image-based Measurement of Phase Transfer Function," Dept. of Electrical Engineering, SMU, 2010 Optical Society of America, 3 pages.
Chen, Shengyong et al., "Active Sensor Planning for Multiview Vision Tasks," Springer-Verlag Berlin Heidelberg, ISBN: 978-3-540-77071-8, 2008, 274 pages.
Chen, "New 3D Scanning Techniques for Complex Scenes," Ph.D. thesis 2008, Max-Planck-Institut für Informatik, Saarbrüken, Germany, 115 pages.

(Continued)

*Primary Examiner* — Lin Ye
*Assistant Examiner* — Mekonnen Dagnew
(74) *Attorney, Agent, or Firm* — Fish & Richardson P.C.

(57) ABSTRACT

Systems and methods can be configured to perform operations related to determining a phase transfer function of a digital imaging system. A digital image that includes at least one edge is received, the at least one edge includes a plurality of pixels with disparate pixel values. The at least one edge from the digital image is identified and an edge spread function is generated based on the identified edge. The edge spread function can be generated by taking at least one slice across the identified at least one edge. A line spread function is generated based on the edge spread function. An optical transfer function is generated based on a Fourier transform of the line spread function. A phase error is also identified. The phase transfer function of the digital image is identified based on the phase of the generated optical transfer function and the identified phase error.

32 Claims, 5 Drawing Sheets

(56) References Cited

OTHER PUBLICATIONS

Garcia, V. Mico, D. Cojoc, and Z. Zalevsky, "Full field of view super-resolution imaging based on two static gratings and white light illumination," Appl. Opt. 47, 3080-2087 (2008).

Gustafsson, Mats G.L. et al., "Doubling the lateral resolution of wide-field fluorescence microscopy using structured illumination," Proceedings of SPIE, vol. 3919, 2000, pp. 141-150.

Gustaffson, M. "Surpassing the lateral resolution limit by a factor of two using structured illumination microscopy," J.Microsc.198 (2000).

Halioua, M. et al., "Projection moire with moving gratings for automated 3-D topography," Applied Optics, vol. 22, No. 6, Mar. 15, 1983, 6 pages.

Hartley, et al., "Multiple View Geometry in Computer Vision Second Edition," Chapter 6 "Camera Models," Cambridge University Press, 2003, 19 pages.

Heintzmann, et al., "Breaking the resolution limit in light microscopy," Briefing in Functional Genomics and Proteomics, vol. 5, No. 4, 289-301, (2006), 13 pages.

Hopkins, "Image shift, phase distortion and the optical transfer function,:" Optica Acta, 1984, vol. 32, No. 3, 345-368, 24 pages.

Huynh, D. Q. et al., "Calibrating Structured Light Stripe System: A Novel Approach," Int'l Journal of Computer Vision 33(1), 73-86 (1999), 14 pages.

Lanman, D. et al., "Build Your Own 3D Scanner: 3D Photography for Beginners," SIGGRAPH 2009 Course Notes, Aug. 5, 2009, 94 pages.

Lin, R. Huang, P. Tsai and C. Lee, "Wide-field super-resolution optical sectioning microscopy using a single spatial light modulator," J. Opt. A: Pure Appl. Opt. 11 (2009).

Lukosz, W., "Optical Systems with Resolving Powers Exceeding the Classical Limit," Journal of the Optical Society of America, vol. 56, No. 11, Nov. 1966, pp. 1463-1472.

Lukosz and M. Marchand, "Optischen Abbildung Unter Ueberschreitung der Beugungsbedingten Aufloesungsgrenze," Opt. Acta 10, 241-255, 1963 (NOTE: An English translation of this article is on p. 254 of the attached article.).

Martinez, et al., "Progress In Optics," Chapter 1 "The Resolution Challenge in 3D Optical Microscopy," Elsevier, 2009, 36 pages.

Meadows, D. M. et al., "Generation of Surface Contours by MoiréPatterns," Applied Optics, vol. 9, No. 4, Apr. 1970, pp. 942-947.

Micó, Vincente et al., "Optical Superresolution: Imaging Beyond Abbe's Diffraction Limit," Journal of Holography and Speckle, vol. 5, No. 2, American Scientific Publishers, 2009, pp. 1-14.

Morgenstern, B. et al., "Optical Bandwidth Extension in Two Dimensions Beyond the Classical Limit," J. Opt. Soc. Am. 54, 1964, pp. 1282-1283.

Morton, J. B. et al. "A Posteriori method of image restoration," Image Processing Institute, Univ. Southern Calif., J. Opt. Soc. Am., vol. 69, No. 2, Feb. 1979, 11 pages.

Neil M.A., R. Juskaitis, and T. Wilson, "Method of obtaining optical sectioning by using structured light in a conventional microscope," Optics Letters 22, 1905-1907 (1997).

Olsen, J. T. et al. "Comparison of tilted slit and tilted edge super-resolution modulation transfer function techniques," Optical Engineering, Jan. 2007, vol. 46(1), 9 pages.

Rangarajan, Prasanna et al., "Incoherent Optical Super-Resolution using Structured Illumination," Department of Electrical Engineering, Southern Methodist University, Dallas, TX, Optical Society of America, 2010, 28 pages.

Rangarajan, et al., "Surpassing the Diffraction-limit of Digital Imaging Systems using Sinusoidal Illumination Patterns," Department of Electrical Engineering, Southern Methodist University, Dallas, TX, Optical Society of America, 2009, 3 pages.

Rangarajan, et al., "Perspective Imaging under Structured Light," Lyle School of Engineering, Southern Methodist University, Dallas, TX, Mar. 17, 2010, 14 pages.

Salvi, et al., "A state of the art in structured light patterns for surface profilometry,"Institute of Informatics and Applications, University of Girona, Girona, Spain, Mar. 18, 2010, 36 pages.

Shroff, J. R. Fienup, and D. R. Williams, "Phase-shift estimation in sinusoidally Illuminated images for lateral superresolution," J. Opt. Soc. Am. A 26, 413-424 (2009).

Takeda, Mitsuo et al., "Fourier transform profilometry for the automatic measurement of 3-D object shapes," Applied Optics, vol. 22, No. 24, Dec. 15, 1983, pp. 3977-3982.

Utkin, A. B. et al., "On the relation between the wave aberration function and the phase transfer function for an incoherent imaging system with circular pupil," Eur. Phys. J. D. 17, 145-148 (2001), 6 pages.

Vaquero, Daniel A., Ramesh Raskar, Rogerio S. Feris, & Matthew Turk. "A Projector-Camera Setup for Geometry-Invariant Frequency Demultiplexing," in IEEE Computer Vision and Pattern Recognition (CVPR'09).

Zhang, et al., "Novel method for structured light system calibration,:" Optical Engineering, 45(8), Aug. 2006, 8 pages.

Zhang & S. K. Nayar, "Projection Defocus Analysis for Scene Capture and Image Display," SIGGRAPH2006, pp. 907-915.

Zalevsky, et al., "The Concept of Superresolution," Optical Superresolution, Library of Congress, 2004, 19 pages.

Zalevsky, et al., "Geometrical Superresolution," Optical Superresolution, Library of Congress, 2004, 32 pages.

Office Action issued in U.S. Appl. No. 12/785,334 on Nov. 20, 2012; 11 pages.

Office Action issued in U.S. Appl. No. 12/785,334 on Apr. 30, 2013; 9 pages.

Notice of Allowance issued in U.S. Appl. No. 12/785,334 on Aug. 5, 2013; 10 pages.

* cited by examiner

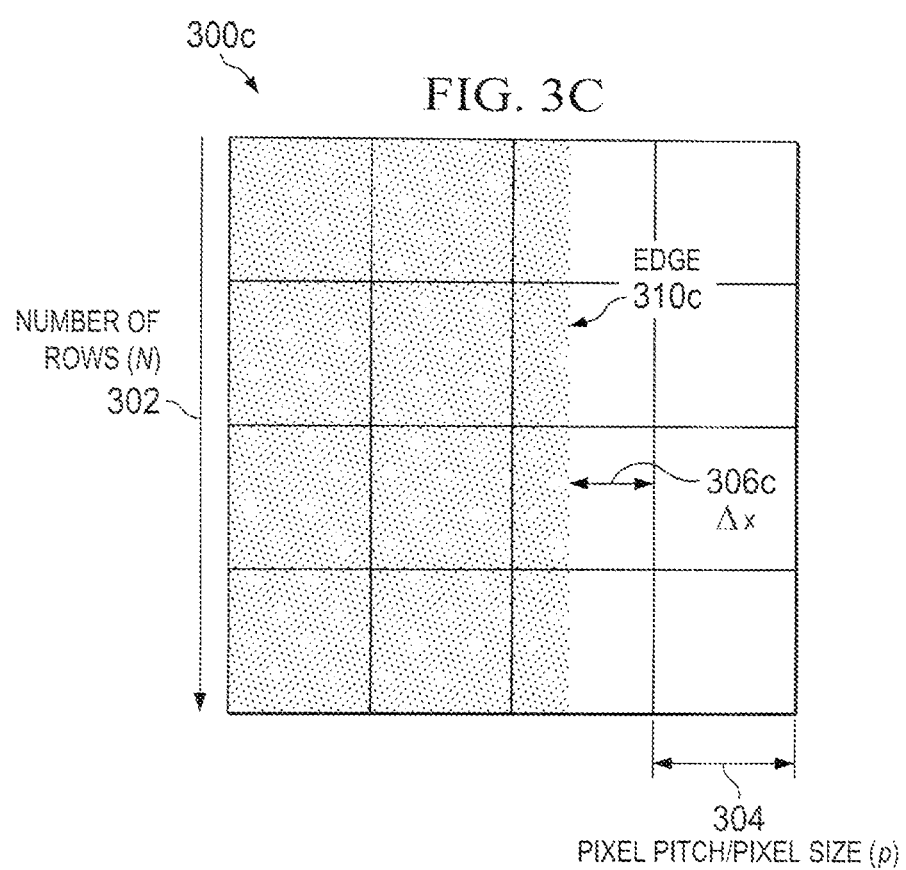

DETERMINING PHASE TRANSFER FUNCTION

TECHNICAL FIELD

This disclosure relates to digital imaging, and more particularly, to phase transfer function identification.

BACKGROUND

Digital-optical imaging systems can be characterized using their optical transfer function (OTF). The OTF can represent the transformation of the spatial frequency content of the object onto the image plane. The OTF may be decomposed into a magnitude component, represented by the modulation transfer function (MTF) and a phase component, represented by the phase transfer function (PTF). The MTF can represent the contrast reduction at each spatial frequency, whereas the PTF can represent the spatial shift of the spatial frequency. The MTF can be used to characterize imaging systems including imaging performance and image quality. The optics of the computational imaging architectures can also exhibit a substantial PTF presence.

SUMMARY

In a general aspect, this specification describes systems and methods relating to identifying PTF of digital imaging.

In some aspects, methods and systems can be configured to perform operations including receiving a digital image from a digital imaging source, the received digital image can include at least one edge, the at least one edge can include a plurality of pixels with disparate pixel values. The at least one edge from the digital image can be identified and an edge spread function (ESF) can be generated based on the identified edge(s). In some instances, the ESF can be generated by taking at least one slice across the identified edge(s). A line spread function (LSF) can be generated based on the ESF, and in some instances, an OTF can be generated based on computing a Fourier transform of the LSF. A phase error can also be identified. Consequently, the PTF of the digital imaging system can be identified based on the phase of the generated OTF and the identified phase error.

Implementations may include one or more of the following features. Identifying the at least one edge can include determining whether the at least one edge is tilted, and identifying the tilted angle of the at least one edge if the at least one edge is tilted. In some implementations, the PTF of the digital imaging system can be identified based on the phase of the generated OTF and the identified tilted angle of the at least one edge.

Additionally or alternatively, implementations may include one or more of the following features. Identifying the at least one edge can include determining whether the at least one edge is misaligned, and identifying at least one sub-pixel edge location associated with the at least one edge if the at least one edge is misaligned. In some implementations, the PTF of the digital imaging system can be identified based on the phase of the generated OTF and the at least one sub-pixel edge location associated with the at least one edge.

Additionally or alternatively, implementations may include one or more of the following features. Generating an ESF can include sampling the identified at least one edge of the digital image along an orientation perpendicular to the identified at least one edge; and generating the ESF based on averaging the sampled data.

Additionally or alternatively, implementations may include one or more of the following features. Generating an LSF based on the generated ESF can include generating an LSF by taking a first derivative of the ESF. In some implementations, generating an LSF can also include re-centering the LSF with respect to its peak. In some instances, re-centering the LSF can include re-centering the LSF based on a computational window and zero padding associated with the computational window.

Additionally or alternatively, implementations may include one or more of the following features. Identifying from the generated OTF can also include identifying from the generated OTF an MTF based on the magnitude of the generated OTF. In some instances, identifying the MTF can include identifying an optical cut-off frequency from the identified MTF and forcing the identified PTF to be zero beyond the optical cut-off frequency.

Additionally or alternatively, implementations may include one or more of the following features. Identifying the PTF can include unwrapping PTF values beyond plus and minus 180 degrees. The unwrapping may be associated with the overlap of PTF values due to phase wrapping.

Additionally or alternatively, implementations may include one or more of the following features. The phase error is associated with the at least one edge, and the phase error can result from a shift of the at least one edge with respect to a pixel edge of the digital image. Additionally or alternatively, the phase error associated with the at least one edge can result from an error in an estimation of a shift of the at least one edge with respect to a pixel edge of the digital image. Additionally or alternatively, the phase error associated with the at least one edge can result from a tilt angle of the at least one edge with respect to a pixel edge of the digital image. Additionally or alternatively, the phase error associated with the at least one edge can result from an error in an estimation of a tilt angle with respect to a pixel edge of the digital image. Additionally or alternatively, the phase error associated can result from one or more digital processing algorithms associated with the method for determining a phase transfer function, or a combination of errors associated with the at least one edge and the digital processing algorithms associated with the method for determining the phase transfer function.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3C is a schematic showing an example object scene including a straight edge with sampling phase shift, but without tilt.

Like reference symbols in the various drawings indicate like elements.

DETAILED DESCRIPTION

A digital-optical imaging system can be characterized using its optical transfer function (OTF), which represents the transformation of the spatial frequency content of the object onto the image plane. The OTF may be decomposed into its magnitude, represented by the modulation transfer function (MTF) and its phase, given by the phase transfer function (PTF).

Figure 3A:
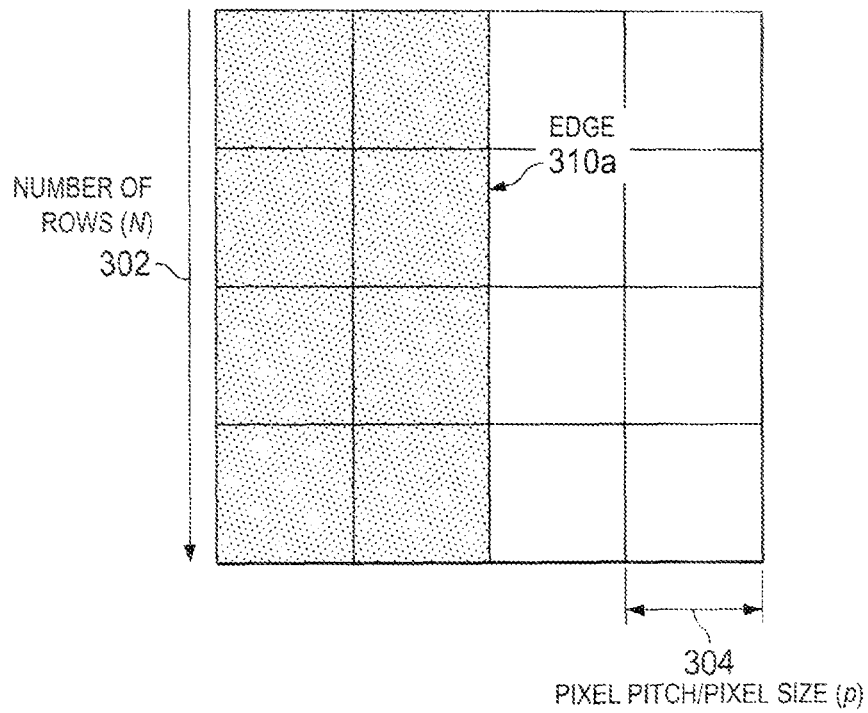
FIG. 3A is a schematic showing an example object scene including a straight edge without sampling phase shift and tilt.
Figure 3B:
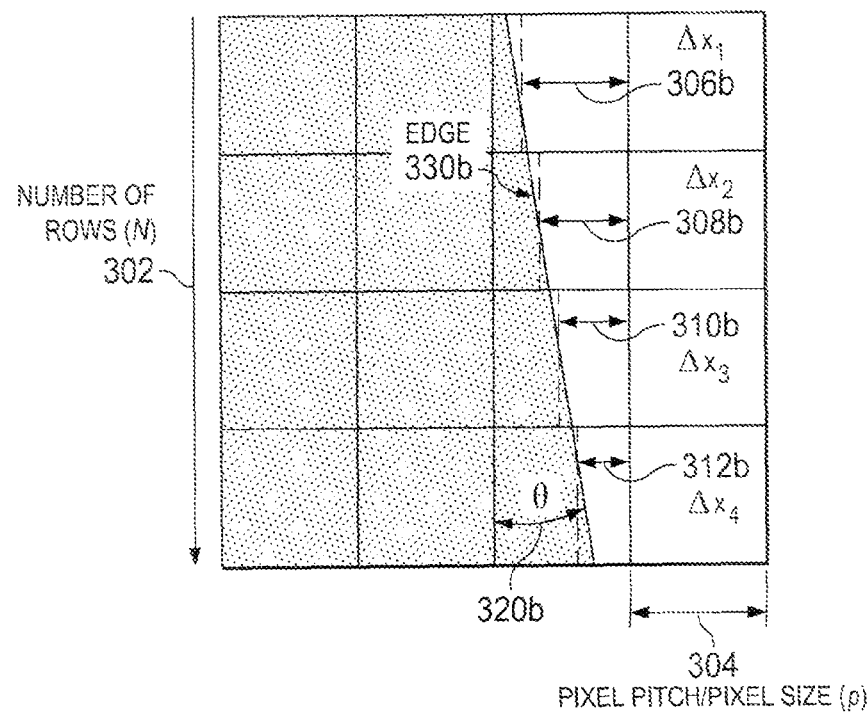
FIG. 3B is a schematic showing an example object scene including a tilted edge with sampling phase shift and tilt.

The present disclosure provides for (or relates to) systems and methods for PTF identification. An image processing system and/or device can be used to process the arbitrarily oriented edge from an arbitrary image received from an image source. For example, the edge may be oriented along a sensor sampling grid, as shown in FIG. 3A; or the edge may be rotated at an angle relative to the sensor sampling grid orientation, as shown in FIG. 3B. The processed edge may be further processed to obtain an edge spread function (ESF). A line spread function (LSF) can then be computed based on the ESF and an optical transfer function (OTF) can be computed based on the LSF. Finally, a PTF can be extracted and/or unwrapped based on the OTF. The systems and methods can be implemented for different kinds of edges identified directly and/or indirectly from the scene, including straight edge, tilted edge and/or misaligned edge. The estimated PTF using the method can be uncorrupted in a non-aliased spectral region.

The image-based PTF measurement can be used for improving the testing, characterization and alignment of digital systems. In some implementations, image-based PTF measurement of incoherent imaging can be used to characterize the performance of imagers that exhibit odd-order aberrations such as coma. Knowledge of the PTF thus obtained may be subsequently used to either correct the imager's optics or to modify reconstruction algorithms to digitally correct the effects of such aberrations in real-time. In some implementations, the PTF measurement can be used in computational imaging systems such as wavefront coded imagers. For example, the OTF of a cubic-phase wavefront coding imager contains a significant phase component, which imparts perceptible shifts to various spatial frequencies in the image. Inclusion of the PTF in the reconstruction algorithm may be able to compensate for the shifts. In some instances, in sparse aperture optical systems, knowledge of true PTF may be utilized to estimate the phase errors between sub-apertures. In some instances, the PTF obtained through image-based measurement may also be employed as a performance metric for adaptive, closed-loop-feedback imaging systems. Similarly, the PTF measurement may be useful in the alignment of optical components during manufacture and assembly, and may be incorporated into reconstruction algorithms of computational imaging systems to improve image reconstruction results. Other features, aspects, and advantages of the subject matter will become apparent from the following description.

Figure 1:
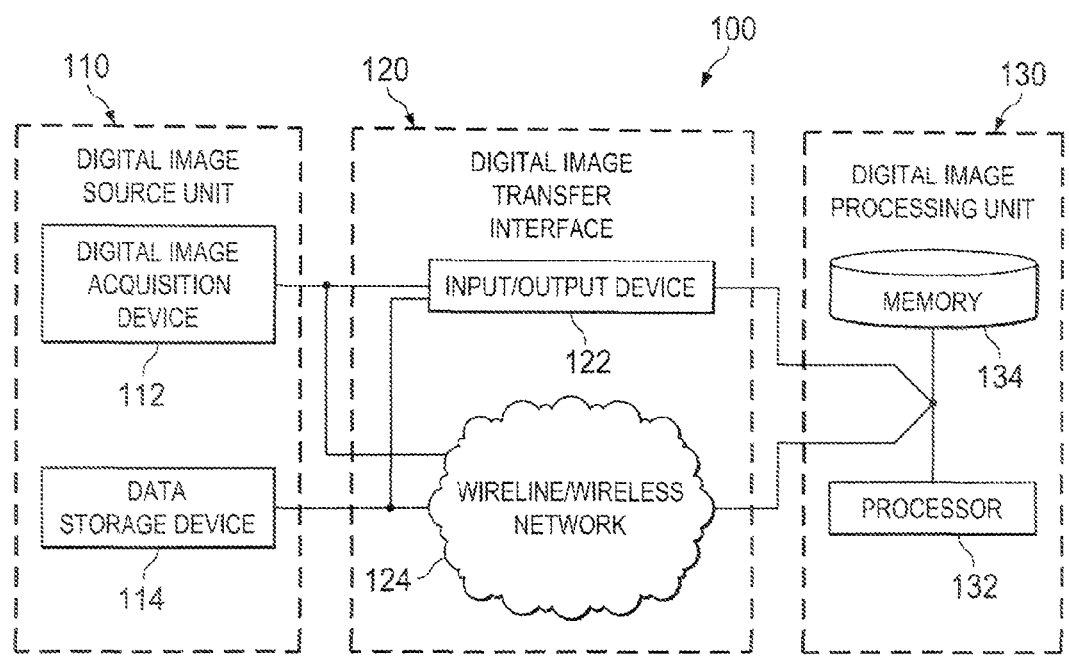
FIG. 1 is a schematic representation of an example system environment in which digital image processing can be performed.

FIG. 1 is a schematic representation of an example system environment 100 in which digital image processing can be performed to identify PTF from an image. At a high level, the example system includes a digital image source unit 110, a digital image transfer interface unit 120 and a digital image processing unit 130. The digital image source unit 110 can include any digital image acquisition device 112, data storage device 114 or any other devices which can perform as a digital image source for digital image processing. For example, the digital image acquisition device 112 may be a digital camera, a smart phone (equipped with a camera), a webcam, a scanner or any other devices which can acquire, receive, transfer or capture image(s). The data storage device 114 can include all forms of non-volatile memory, media and memory devices, including by way of example, semiconductor memory devices, e.g., EPROM, EEPROM, and flash memory devices; memory card; hard drive; magnetic disks, e.g., internal hard disks or removable disks; magneto optical disks; CD-ROM, DVD-ROM and Blu-ray disks. The data storage device may also be a laptop computer, a desktop computer, a server or any other devices which can store image(s). The digital image transfer interface unit 120 can be an interface between the digital image storage unit and the digital image processing unit 130. In other words, the digital image transfer interface 120 can feed into the digital image processing unit 130 the output of the digital image source unit 110. The digital image information can be transferred to the digital image processing unit 130 through wireline and/or wireless communications. Example wireline and wireless digital image transfer interface 120 may include hardware input/output devices 122 (e.g., USB cord, CD-ROM, memory card reader, etc.,) and network 124. Generally, the network 124 facilitates wireless or wireline communications between the components of the environment 100 (i.e., between the digital image storage unit and the digital image processing unit 130), as well as with any other local or remote devices communicably coupled to the network 124 but not illustrated in FIG. 1. The network 124 is illustrated as a single network in FIG. 1, but may be a continuous or discontinuous network without departing from the scope of this disclosure, so long as at least a portion of the network may facilitate communications between senders and recipients. The network 124 may be all or a portion of an enterprise or secured network, while in another instance at least a portion of the network 124 may represent a connection to the Internet. In some instances, a portion of the network 124 may be a virtual private network (VPN), such as, for example, the connection between the client and the server. Further, all or a portion of the network 124 can comprise either a wireline or wireless link. Example wireless links may include 802.11a/b/g/n, 802.20, WiMAX, Bluetooth and/or any other appropriate wireless link. In other words, the network 124 encompasses any internal or external network, networks, sub-network, or combination thereof operable to facilitate communications between various computing components inside and outside the illustrated environment. The network 124 may communicate, for example, Internet Protocol (IP) packets, Frame Relay frames, Asynchronous Transfer Mode (ATM) cells, voice, video, data, and other suitable information between network addresses. The network 124 may also include one or more local area networks (LANs), radio access networks (RANs), metropolitan area networks (MANs), wide area networks (WANs), all or a portion of the Internet, and/or any other communication system or systems at one or more locations.

The digital image processing unit 130 can be a major component of the example environment that performs digital image processing. At a high level, the digital image processing unit 130 can include a processor 132 and a memory 134. The digital image processing unit 130 can be incorporated on a laptop computer, a desktop computer, a server or any other device which has a processor 132 and a memory 134.

As illustrated in FIG. 1, digital image processing unit 130 includes a processor 132. The processor 132 executes one or more hosted applications on the digital image processing unit 130. Although illustrated as a single processor 132 in FIG. 1, two or more processors may be used according to particular needs, desires, or particular embodiments of the environment. Each processor 132 may be a central processing unit (CPU), a blade, an application specific integrated circuit (ASIC), a field-programmable gate array (FPGA), or another suitable component. Generally, the processor 132 executes instructions and manipulates data to perform the operations of the digital image processing unit 130 and, specifically, the one or more plurality of hosted applications. Specifically, the processor 132 executes the functionality required to receive and respond to requests from the clients and their respective client applications, as well as the functionality required to perform the other operations of the hosted application. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

A computer program (also known as a program, software, software application, script, or code) executed by the processor 132 can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network 124.

Aspects of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors 132 suitable for the execution of a computer program include, by way of example, both general and special purpose microprocessors, and any one or more processors of any kind of digital computer. Generally, a processor 132 will receive instructions and data from a read only memory or a random access memory or both. The essential elements of a computer are a processor 132 for performing actions in accordance with instructions and one or more memory devices for storing instructions and data. Generally, a computer will also include, or be operatively coupled, to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor 132 and the memory 134 can be supplemented by, or incorporated in, special purpose logic circuitry.

The digital image processing unit 130 can also include memory 134. Memory 134 may be used to store image(s) received from the digital image transfer interface unit 120 and/or after the image(s) is processed by the processor 132. Memory 134 may include any memory 134 or database module and may take the form of volatile or non-volatile memory including, without limitation, magnetic media, optical media, random access memory (RAM), read-only memory (ROM), removable media, or any other suitable local or remote memory component. Memory 134 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the digital image processing unit and its one or more hosted applications. Additionally, memory 134 may include any other appropriate data, such as VPN applications, firmware logs and policies, firewall policies, a security or access log, print or other reporting files, as well as others.

The memory 134 can also store instructions (e.g., computer code) associated with an operating system, computer applications, and/or other resources. The memory 134 can also store application data and data objects that can be interpreted by one or more applications and/or virtual machines running on the computing system. The memory 134 may store additional information, for example, files and instruction associated with an operating system, device drivers, archival data, and/or other types of information.

Figure 2:
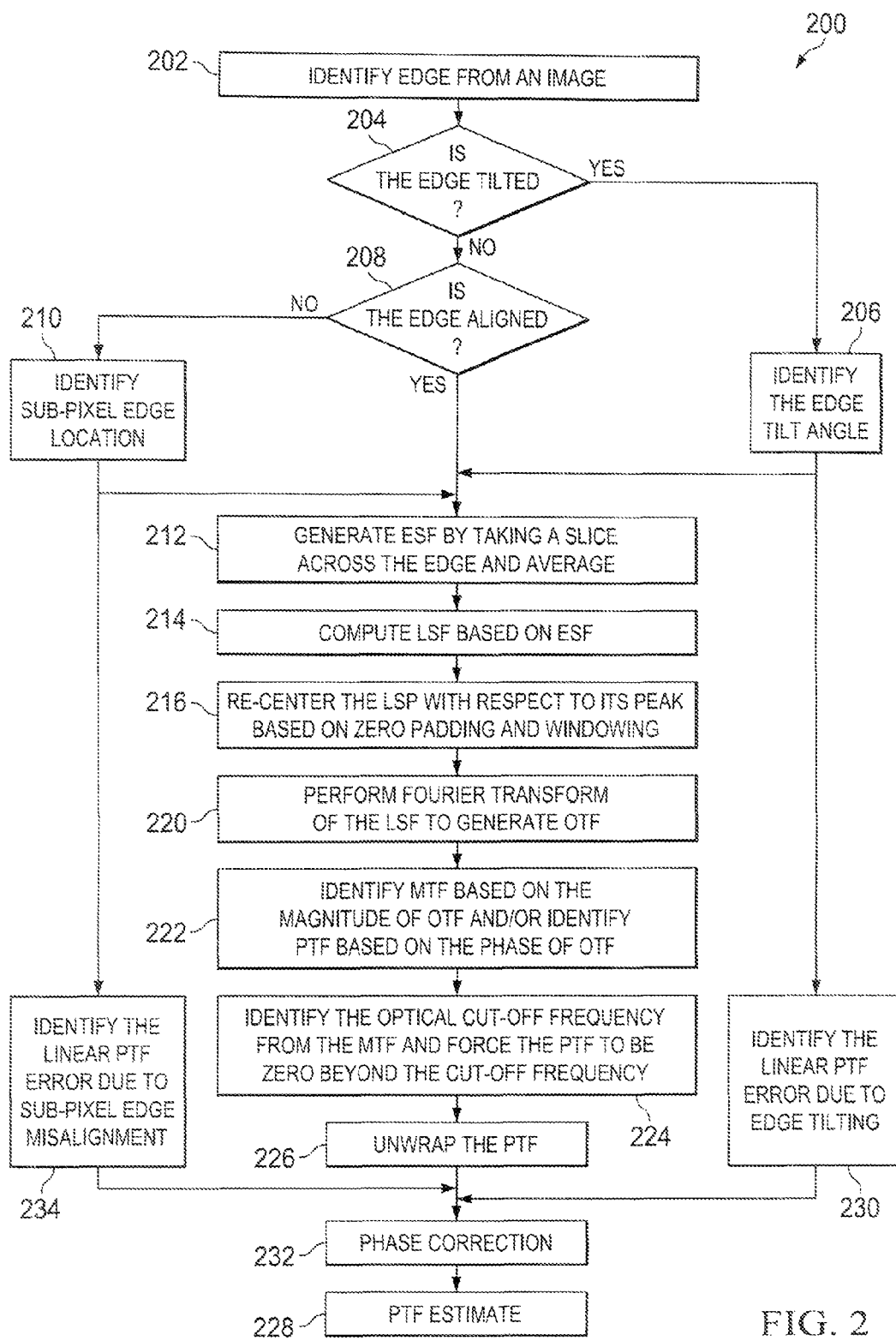
FIG. 2 is a flowchart showing an example method of measuring phase transfer function.

FIG. 2 is a flowchart illustrating an example method 200 of measuring phase transfer function. The example method 200 can be performed by one or more processors as described above (or any combination thereof). In some implementations, the method 200 may include additional, fewer, and/or different operations performed in the order shown or in a different order. Moreover, one or more of the individual operations and/or subsets of the operations in the method 200 can be performed in isolation and/or in different contexts to achieve a similar or different result. In some implementations, one or more of the operations in the method 200 may be iterated, repeated, omitted, modified, and/or performed by multiple sub-operations. Some or all aspects of the method may be implemented by one or more processors of the described digital image processing unit 130 executing computer-readable instructions, which may be included in one or more software programs, modules, or applications configured to provide the functionality described. At a high level, the example method 200 illustrated in FIG. 2 includes 3 high-level processes: (1) Process the edge from an arbitrary image; (2) Obtain an edge spread function (ESF) from the processed edge and calculate a line spread function based on the ESF; and (3) Calculate an optical transfer function (OTF) based on the LSF and correct and unwrap the PTF associated with the OTF.

The example method 200 starts at 202 where the edge from an image is identified and/or extracted. The image can be an arbitrary image with at least one edge. The image can be stored in the memory 134 of the digital image processing unit 130 communicatively coupled with the processor. The image can also be transferred to the digital image processing unit 130 from the digital image source unit 110 through the digital image transfer interface 120. The at least one edge can be identified based on any edge detection and/or localization method. At 204, a decision on whether the identified edge target is tilted with respect to the pixel grid can be made. Turning briefly to FIG. 3B, FIG. 3B is a schematic showing a small region of an example object scene 300b including a tilted edge with sampling phase shift and tilt, where N 302 is the number of rows, p 304 is the pixel pitch or pixel size, $\Delta x_1$ 306b, $\Delta x_2$ 308b, $\Delta x_3$ 310b, and $\Delta x_4$ 312b are the linear sampling phases (or sampling phase shift) of different pixels. It is shown in the example schematic that the edge 330b is tilted with a tilted angle θ 320b. Returning back to the description of FIG. 2, if the identified edge is tilted, the processor can perform a sequence of algorithm based instructions to estimate the edge tilt angle. In some implementations, calculating the partial derivatives of the sampled edge can provide an indication of whether the edge is tilted. If the edge is tilted, tools (such as the Radon Transform, as well as other tools) may be used to estimate the tilt angle (206). In a general aspect, sampling can result in converting continuous optical light field (image) to a list of numbers (sampled digital signals) corresponding to the light integrated onto each detector element. In some instances, the sampling process can be affected by aliasing if the detector element size and spacing are not sufficiently close to capture the highest spatial frequency content of the light field (image). In some implementations, sampling the edge may include sampling using a Nyquist rate. The calculation of the partial derivative can be along the horizontal orientation and/or vertical orientation. Otherwise, the processor can proceed to 208 where it can decide whether the identified edge is aligned. If the identified edge target is not aligned (e.g., edge is shifted with respect to the sensor sampling grid), the processor can perform a sequence of instructions to estimate sub-pixel edge location(s) at 210. FIG. 3C is a schematic showing an example object scene 300c including a straight edge with sampling phase due to shift, but without tilt. It is shown in the example schematic that the edge 310c is shifted by $\Delta x$ 306c. Otherwise, there is no tilt and misalignment of the sub-pixels along the edge, FIG. 3A is a schematic showing an example object scene 300a including a straight edge without sampling phase shift and tilt. In such case, the processor may proceed to 212 where it can perform a sequence of instructions to compute an ESF by taking a slice across the edge. In some implementations, the identified edge is tilted, computing an ESF by taking a slice across the edge may also take into account the estimated edge tilt angle at 206. In some implementations, the identified edge is not aligned, and computing an ESF by taking a slice across the edge may also take into account the estimated sub-pixel edge location at 210. In some implementations, an averaged ESF can be determined by averaging multiple rows across the edge. In some implementations, the sampled edge data can be averaged to obtain the ESF to reduce the effect of noise.

At 214, the processor can perform a sequence of instructions to compute the derivative of the ESF to get the LSF. In some implementations, computing the derivative of the ESF may results in amplifying noise. Numerical differentiation techniques of noisy data can be used to account for the corruption of phase information due to noise. At 216, the calculated LSF can be re-centered with respect to its peak. In some implementations, re-centering the LSF with respect to its peak includes re-centering the peak of the LSF with respect to a computational window and/or use zero-padding in order to eliminate the accumulation of linear phase error. In some implementations, the computational window can be Hanning window or Hamming window to reduce truncation artifacts.

At 220, Fourier transform can be performed to the LSF in order to compute the OTF. The resultant OTF after Fourier transform may be a one dimensional OTF. In some implementations, the number of data points (i.e., length) of the LSF is odd and next to power of 2 (e.g., 128, 255 . . .) such that the phase error due to the Fourier transforming operation may be reduced or avoided. At 222, the modulation transfer function (MTF) and the PTF can be determined based on the OTF. The MTF may be the magnitude of the OTF, and the PTF may be the phase of the OTF. At 224, the optical cut-off frequency from the MTF estimate can be identified and the PTF beyond the cut-off frequency can be forced to zero. In some instances, performing a discrete Fourier transform operation on an LSF of finite support may generate artifacts at the boundary, resulting in dubious PTF data beyond the optical spatial frequency cutoff. Forcing PTF values outside the optical cutoff frequency to zero can eliminate the dubious PTF data.

At 226, the PTF can be unwrapped. In some instances, the use of arctangent function to determine the phase may result in phase wrapping when the PTF values exceed ±π, the PTF data may be unwrapped to recover the PTF of the original image. The processor can perform a sequence of instructions at 228 to compute the PTF from the unwrapped PTF at 226. A particular implementation of computing the OTF (including MTF and PTF) without sampling phase shift and tilt (such as the example shown in FIG. 3A) can be described as follows:

Let i(x) denote an image, the image i(x) can be expressed as:

$$i(x) = h(x) \otimes o(x), \tag{1}$$

where the symbol $\otimes$ denotes the convolution operation, h(x) denotes the space invariant PTF. The function o(x) represents the object signal, which can be expressed as $$o(x) = \frac{1}{N} \sum_{r=1}^{N} e(x + \Delta x_r), \tag{2}$$

where e(x) represents the ESF derived from the high contrast edge in the image, $\Delta x_r$ is the sampling phase shift of the $r^{th}$ row, and N is the number of rows used in the calculation. Further, $$e(x + \Delta x_r) = \begin{cases} 0, & x < \Delta x_r \\ 1, & x \geq \Delta x_r \end{cases}. \tag{3}$$

In the Fourier domain, the step edge function may be represented as:

$$E(f) = \left(\frac{\delta(f)}{2} + \frac{1}{j2\pi f}\right) SPTE(f), \tag{4}$$

where SPTE(f) is the sampling phase and tilt error (SPTF) in the Fourier domain which may result from the shift and/or tilt in edge location in the image plane corresponding to the detector grid.

Equation (1) can be represented in the Fourier domain. The frequency domain representation of the image can be expressed as:

$$I(f)=H(f)O(f)$$

where I(f) is the spectrum of the image, Ho is the OTF and O(f) is the object spectrum. Using equations (2)-(4), the captured edge image can be represented in the Fourier domain by the following expression:

$$I(f)=H(f)E(f)SPTE(f). \quad (5)$$

The LSF can be estimated from the captured details by using first derivative:

$$l(x) = \frac{d[i(x)]}{dx}.$$

The one dimensional OTF, He(f), can be estimated by Fourier transformation of the LSF l(x):

$$H_e(f) = FT\{l(x)\} = FT\left\{\frac{d[i(x)]}{dx}\right\}.$$

Additionally or alternatively, the first derivative property of the Fourier transform can be used to estimate the OTF as shown below:

$$H_e(f) = j2\pi f\left[H(f)\left[\frac{\delta(f)}{2} + \frac{1}{j2\pi f}\right]SPTE(f)\right]. \quad (6)$$

$$H_e(f) = H(f)SPTE(f).$$

In the case of computing OTF without edge tilting and sampling phase shift, it can be shown that SPTE(f)=1 and $\Delta x_r$=0. Thus, the estimated OTF can be written as:

$$H_e(f)=H(f).$$

Where H(f) represents the OTF and δ(f) is the Dirac delta function with respect to f.

If the identified edge of the image is tilted (such as the example shown in FIG. 2B), the sub-pixel sampling linear PTF tilt error can be identified at 230 to allow for correction of the resulting phase error (232). Phase error may be introduced during certain processing steps, such as those identified as steps 212-220. The accumulation of the resulting phase error(s) through the processing sequence may be corrected at step 232. In certain implementations, the phase error is corrected at step 232 by subtracting the error term from the unwrapped PTF. At 228, the PTF can be estimated based on the unwrapped PTF 226 and the phase correction 232. A particular implementation on the derivation of OTF by correcting the effect of sampling phase error due to tilt can be described as follows: For the tilted edge target, the ESF from each row will have different phase errors, or SPTE. Averaging these rows will result in accumulated SPTE. The error may be propagated through the PTF estimation method. The estimated OTF, He(f), can be derived by substituting $\Delta x_r$ with $$\left(rp - \frac{p}{2}\right)$$

tan θ in equations (2) and (3), where p is the pixel-pitch of the detector array and θ is the edge tilting angle. Further, SPTE(f) can be computed as:

$$SPTE(f) = \sum_{r=1}^{N} e^{-j2\pi f \Delta x_r}.$$

Additionally or alternatively, SPTE(f) may be estimated from the edge tilt and pixel-pitch by using the following expression, $$SPTE(f) = \frac{\sin(N\pi f p \tan\theta)}{\sin(\pi f p \tan\theta)} \exp(-jN\pi f p \tan\theta).$$

Figure 4A:
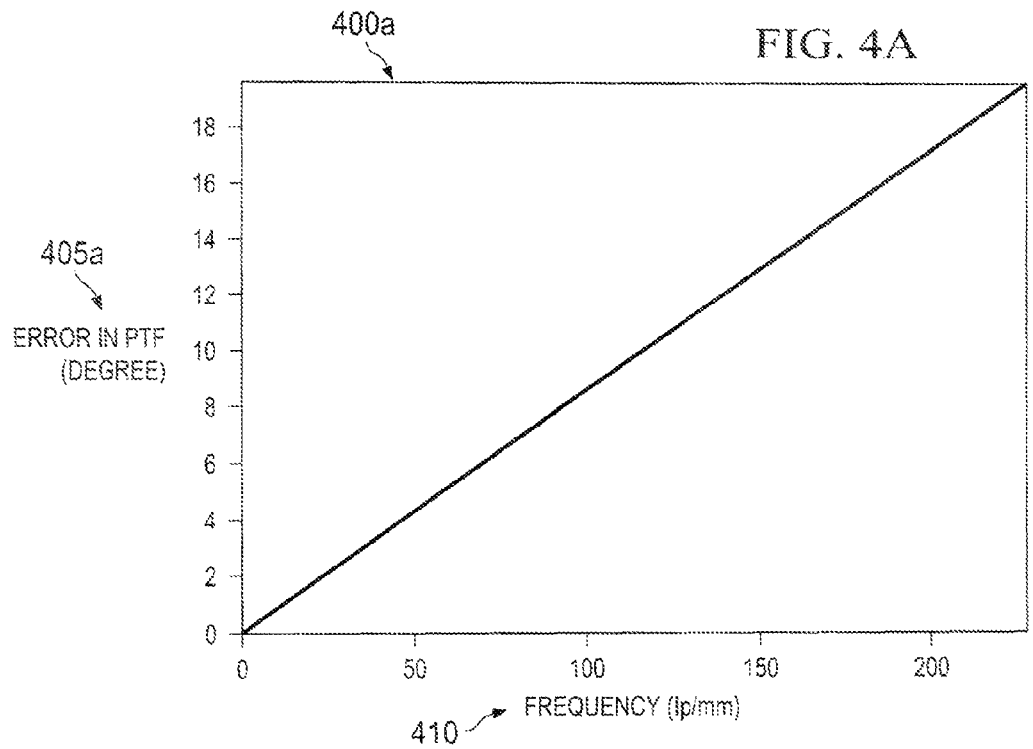
FIG. 4A is an example plot showing error in PTF resulting from 0.5 degrees of edge tilt angle.
Figure 4B:
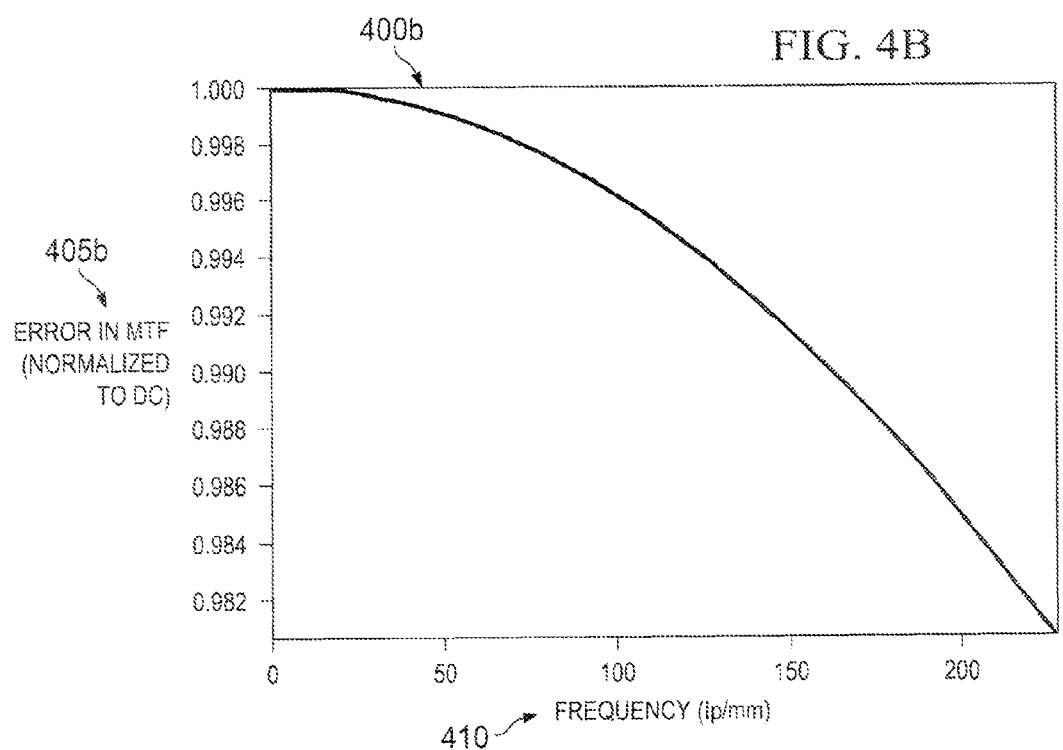
FIG. 4B is an example plot showing error in MTF resulting from 0.5 degrees of edge tilt angle.

This expression can be utilized to estimate the PTF error correction term. The sampling phase error due to edge tilt may introduce error in both the MTF and PTF estimates. The error in MTF estimate may be small and often indistinguishable from noise. However, the error in PTF can be significant, leading to poor estimates of PTF. For example, FIG. 4A is an example plot 400*a* illustrating the PTF error 405*a* with respect to frequency 410, and FIG. 4B is an example plot 400*b* illustrating the MTF error 405*b* with respect to frequency 410. The PTF error 405*a* and MTF error 405*b* are resulting from a 0.5 degree error in tilt estimate. These example plots are generated for a digital imaging system that has a 2.2 micron pixel-pitch. In this example, the edge tilt angle with respect to the sampling grid is 0.5 degrees and number of rows, N, is 25.

Therefore, $H_e(f)$ can be expressed as:

$$H_e(f) = H(f)\left\{\frac{\sin(N\pi f p \tan\theta)}{\sin(\pi f p \tan\theta)} \exp(-jN\pi f p \tan\theta)\right\}.$$

If the identified edge of the image is not aligned (such as the example shown in FIG. 3C), at 234 the sub-pixel sampling phase error may be identified to allow for correction of the resulting phase error (232). Phase error may be introduced during certain processing steps, such as those identified as steps 212-220. The accumulation of the resulting phase error(s) through the processing sequence may be corrected at step 232. In certain implementations, the phase error is corrected at step 232 by subtracting the error term from the unwrapped PTF. At 228, the PTF can be estimated based on the unwrapped PTF at 226 and the phase correction 232. A particular implementation on the derivation of OTF by correcting the effect of sampling phase error due to shift can be described as follows: If the edge is straight, then $\Delta x_r = \Delta x$, where Δx is the sampling phase shift of the straight edge, and the SPTE is given by SPTE=$e^{-j2\pi f \Delta x}$. Thus, the estimated OTF can be expressed as:

$$H_e(f)=H(f)e^{-j2\pi f \Delta x}.$$

In some implementations, the phase error due to shift and/or tilt may result in the numerical error introduced by derivative filter used in computing the LSF at 214. In some implementations, the phase transfer function measurement can be uncorrupted when performed in a non-aliasing region, i.e., the spatial frequency coordinate, f, associated with the image may satisfy $0 \le f \le 2f_n - f_o$, where $f_n$ is the cut-off frequency of the optics, and $f_o$ is the Nyquist frequency of the sensor.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based, at least in part, on one or more other items or operations and may be based exclusively, partially, primarily, secondarily, directly, or indirectly on the one or more other items or operations.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a phase transfer function (PTF) of a digital imaging system, the method comprising:
   receiving a digital image, the digital image including at least one edge, the at least one edge including a plurality of pixels with disparate pixel values;
   identifying the at least one edge from the digital image;
   generating an edge spread function (ESF) by taking at least one slice across the identified at least one edge, wherein the ESF comprises an intensity profile across the identified at least one edge;
   generating a line spread function (LSF) based on the generated ESF;
   generating an optical transfer function (OTF) of the digital image based on a Fourier transform of the LSF;
   identifying a phase error; and
   identifying from the generated OTF the PTF of the digital imaging system based on the phase of the generated OTF and the identified phase error.

2. The method of claim 1, wherein identifying the at least one edge comprises: determining that the at least one edge is tilted; and
   identifying a tilted angle of the at least one edge.

3. The method of claim 2, wherein identifying the PTF is based on the phase of the generated OTF and the identified tilted angle of the at least one edge.

4. The method of claim 1, wherein identifying the at least one edge comprises:
   determining that the at least one edge is misaligned; and
   identifying at least one sub-pixel edge location associated with the at least one edge.

5. The method of claim 4, wherein identifying the PTF is based on the phase of the generated OTF and the at least one sub-pixel edge location associated with the at least one edge.

6. The method of claim 1, wherein generating the LSF is based on the generated ESF includes generating the LSF by computing a first derivative of the ESF.

7. The method of claim 1, wherein generating the LSF also includes re-centering the LSF with respect to its peak.

8. The method of claim 7, wherein re-centering the LSF includes re-centering the LSF based on a computational window size and zero padding associated with the computational window size.

9. The method of claim 1, wherein identifying from the generated OTF also includes identifying from the generated OTF a modulation transfer function (MTF) based on the magnitude of the generated OTF.

10. The method of claim 9, wherein identifying the MTF includes identifying an optical cut-off frequency from the identified MTF and setting the identified PTF to zero beyond the optical cut-off frequency.

11. The method of claim 1, wherein identifying the PTF includes unwrapping PTF values beyond plus and minus 180 degrees due to phase wrapping.

12. The method of claim 1, wherein the phase error is associated with the at least one edge and results from a shift of the at least one edge with respect to a pixel edge of the digital image.

13. The method of claim 1, wherein the phase error is associated with the at least one edge and results from an error in an estimation of a shift of the at least one edge with respect to a pixel edge of the digital image.

14. The method of claim 1, wherein the phase error is associated with the at least one edge and results from a tilt angle of the at least one edge with respect to a pixel edge of the digital image.

15. The method of claim 1, wherein the phase error is associated with the at least one edge and results from an error in an estimation of a tilt angle with respect to a pixel edge of the digital image.

16. The method of claim 1, wherein the phase error results from one or more digital processing algorithms associated with the method for determining a phase transfer function.

17. A digital imaging system comprising:
   a digital image source; and
   a digital image processing apparatus comprising:
      a processor configured to:
         receive from the digital image source a digital image, the digital image including at least one edge, the at least one edge including a plurality of pixels with disparate pixel values;
         identify the at least one edge from the digital image;
         generate an ESF by taking at least one slice across the identified at least one edge, wherein the ESF comprises an intensity profile across the identified at least one edge;
         generate a line spread function (LSF) based on the generated edge spread function (ESF);
         generate an optical transfer function (OTF) of the digital image based on a Fourier transform of the LSF;
         identify a phase error; and
         identify from the generated OTF the phase transfer function (PTF) of the digital imaging system based on the phase of the generated OTF and the identified phase error; and
      a memory that stores information associated with the digital image.

18. The system of claim 17, wherein identifying the at least one edge comprises:
    determining that the at least one edge is tilted; and
    identifying a tilted angle of the at least one edge.

19. The system of claim 18, wherein identifying the PTF is based on the phase of the generated OTF and the identified tilted angle of the at least one edge.

20. The system of claim 17, wherein identifying the at least one edge comprises:
    determining that the at least one edge is misaligned; and
    identifying at least one sub-pixel edge location associated with the at least one edge.

21. The system of claim 20, wherein identifying the PTF is based on the phase of the generated OTF and the at least one sub-pixel edge location associated with the at least one edge.

22. The system of claim 17, wherein generating the LSF based on the generated ESF includes generating the LSF by computing a first derivative of the ESF.

23. The system of claim 17, wherein generating the LSF also includes re-centering the LSF with respect to its peak.

24. The system of claim 17, wherein re-centering the LSF includes re-centering the LSF based on a computational window size and zero padding associated with the computational window size.

25. The system of claim 17, wherein identifying from the generated OTF also includes identifying from the generated OTF a modulation transfer function (MTF) based on a magnitude of the generated OTF.

26. The system of claim 25, wherein identifying the MTF includes identifying an optical cut-off frequency from the identified MTF and setting the identified PTF to zero beyond the optical cut-off frequency.

27. The system of claim 17, wherein identifying the PTF includes unwrapping PTF values beyond plus and minus 180 degrees due to phase wrapping.

28. The system of claim 17, wherein the phase error is associated with the at least one edge and results from a shift of the at least one edge with respect to a pixel edge of the digital image.

29. The system of claim 17, wherein the phase error is associated with the at least one edge and results from an error in an estimation of a shift of the at least one edge with respect to a pixel edge of the digital image.

30. The system of claim 17, wherein the phase error is associated with the at least one edge and results from a tilt angle of the at least one edge with respect to a pixel edge of the digital image.

31. The system of claim 17, wherein the phase error is associated with the at least one edge and results from an error in an estimation of a tilt angle with respect to a pixel edge of the digital image.

32. The system of claim 17, wherein the phase error results from one or more digital processing algorithms associated with the method for determining a phase transfer function.

* * * * *